Jan. 8, 1957 L. W. ERATH ET AL 2,776,560
MEANS FOR MEASURING AND FOR GENERATING MOTION
Filed July 3, 1953 3 Sheets-Sheet 2

Louis W. Erath
Paul E. Madeley
Sidney Hatchl
INVENTORS

BY Thomas O Arnold
ATTORNEY

Jan. 8, 1957     L. W. ERATH ET AL     2,776,560
MEANS FOR MEASURING AND FOR GENERATING MOTION Filed July 3, 1953     3 Sheets-Sheet 3

Fig. 5

Louis W. Erath
Paul E. Madeley
Sidney Hatchl
INVENTORS

BY Thomas O Arnold

ATTORNEY

United States Patent Office 2,776,560
Patented Jan. 8, 1957

2,776,560

MEANS FOR MEASURING AND FOR GENERATING MOTION

Louis W. Erath, Paul E. Madeley, and Sidney Hatchl, Houston, Tex., assignors, by mesne assignments, to Southwestern Industrial Electronics Company, Houston, Tex., a corporation of Delaware Application July 3, 1953, Serial No. 365,996

24 Claims. (Cl. 73—71.2)

This invention relates to systems for suspending a mass for use in various instruments such as seismometers and shaking tables.

Multitudinous instruments have been known heretofore wherein a mass is suspended. In many such instruments, such as low frequency seismometers, the ideal suspension of the mass is one wherein the mass has only one degree of freedom, i. e., freedom to reciprocate along a given line, but no freedom to rotate or to move laterally with respect to said line. Further, in the ideal suspension the natural frequency of the suspension system is zero; or, phrased conversely, the natural period of relative motion between the mass and the fixed support or ground from which the mass is suspended, is infinity.

In apparatus for dynamic measurements, these ideals have never been closely approached, with the result that seismometers and shaking tables known to the art have been necessarily far from ideal. Particularly is this so as to instruments purporting to measure transient phenomena or vibratory motion of very low frequency, such as ¼ cycle per second, or purporting to generate mechanical motion of certain particular forms.

Consider, by way of brief example, the instruments heretofore used to measure vibratory motions or seismic waves of various amplitudes and frequencies. The basic structure common to most of these instruments includes a seismic mass suspended by a spring from a housing, chassis or other support adapted to be fixed in or secured to a vibrating medium, together with means for evaluating the movement of the chassis with respect to the mass when the chassis is subjected to vibratory movements.

In most instruments, the natural frequency of the mass-spring combination is much lower than the frequency of the vibrations to be measured, so that the mass remains substantially stationary while the chassis vibrates with the medium in which it is fixed. The spring is thereby stretched and contracted in vibrations substantially identical to the vibrations of the subject medium.

When the vibration to be measured is of very low frequency, the problem of finding a mass-spring combination of still lower natural frequency becomes great. Long, weak springs and heavier masses are used, but no mass-spring combination of practical size and structural strength can be constructed that has a natural frequency substantially lower than one cycle per second in and of itself. In order for a simple mass-spring combination to have a natural frequency of ¼ C. P. S., the spring must stretch 13⅔ feet without distortion—an impossibility in instruments of practical size for most uses. As a consequence, measurements of vibrations in the ¼ C. P. S. and lower frequency range have, prior to this invention, been difficult or, in some applications, impossible, and always more or less unsatisfactory.

Correspondingly difficult problems arise in the construction of shaking tables wherein it is desired to produce a mechanical movement of substantial amplitude and having low frequency or step components.

Another unsolved problem in the measurement of vibratory motions presents itself when the particular vibration to be measured is accompanied by another vibration of much larger amplitude, sufficiently large to overload the pickup unit, i. e., to cause the pickup or "stationary" mass unit to hit the stops which limit the magnitude of its motion relative to the chassis.

For example certain vibrations of ship decks underway may be on the order of one inch in magnitude. Superimposed upon that vibration there may be an additional vibration caused by the pounding of the waves and pitching of the ship with a magnitude on the order of three or four feet. It is difficult to design a pickup unit that will permit relative movement between the mass and the chassis on the order of four feet, and which will at the same time effect accurate measurements of the one inch vibration. This problem is particularly great when both vibrations are of relatively low frequencies and separated by less than one octave.

An object of this invention, therefore, is to provide a means for suspending a mass so that its period of vibration approaches infinity, or any desired period less than infinity.

Another object of this invention is to provide means for generating mechanical movements of any predetermined form, including mechanical movements having very low frequency and/or step components, and vibratory movements wherein peak, average and R. M. S. values of velocity, acceleration or displacement remain constant with changes in frequency.

Still another object of this invention is to provide improved means for measuring peak, average and R. M. S. values of velocity, acceleration and displacement of mechanical objects.

Yet another object of this invention is to provide an improved arrangement for effecting the operation of a coil in a linear magnetic field.

A further object of this invention is to provide improved means for measuring forces and accelerations, both static and dynamic.

Still a further object of this invention is to provide improved means for suspending a mass to have only one degree of freedom of movement.

A still further object of this invention is to provide improved means for suspending a mass to have only one degree of freedom, wherein said degree of freedom may be in any plane, horizontal, vertical or otherwise.

Another object of this invention is to provide for use in any type of instrument, a novel and improved means for causing a mass-spring combination to behave as though it had a very low natural frequency.

Still another object is to provide an improved gravity meter and accelerometer.

Yet another object is to provide vibration measurement means which discriminates between certain frequencies, and which measures vibrations of small amplitude in the presence of vibrations of sufficiently large amplitude to overload any heretofore known pickup unit.

Other objects will be apparent from the following description and accompanying drawings.

These objects are accomplished in accordance with this invention by first positioning a mass to be supported in a linear magnetic field so that the motion of the mass along the line on which it is free to move is controlled by such magnetic suspension system. In certain embodiments of the invention, this portion of the invention may, among other things, function as a gravity counterbalance, as a gravity meter, as an accelerometer, and as means for activating the mass into predetermined motion patterns.

Further in accordance with this invention, the objects are accomplished by holding the mass (or parts thereof)

in said magnetic field by means of leaf springs, and then causing the mass-spring combination or system to behave as though it had a very low, or zero, natural frequency by causing the "fixed" end of the spring to follow the motion of the mass in such manner as to give the mass-spring system an effective natural frequency that is variable from a value approaching zero upward.

Consider, for purposes of explanation of theory, the nature of measurements of vibratory motion. It is a measurement, in the ideal situation, of relative motion between two bodies, one which is stationary and one which is moving. When it is the earth which is doing the vibrating, however, the obtaining of a stationary body, which must necessarily be mounted on the earth either directly or indirectly, presents a problem.

As aforesaid, if the vibration is of fairly high frequency, 1000 C. P. S., for example, a mass may be suspended from a spring in a mass-spring combination of a natural frequency of 5 cycles per second, for example, and the mass will remain stationary though the earth to which the spring is secured is vibrating. A mass-spring combination with a natural frequency much lower than the frequency of the vibration to be measured, solves the problem of obtaining a stationary object, so long as the frequency of the vibration being measured is fairly high.

Suppose, however, that it is desired to measure a ¼, or ¹⁄₁₀ cycle per second vibration. The only mass-spring combinations with still lower natural frequency are those with natural periods approaching infinity. The problem is even more difficult when it is desired to measure a step motion, wherein a block of concrete moves a certain distance in a certain time, and then returns only part way toward the original position, as might occur when a very large test load is moved across an experimental bridge at slow speed.

In accordance with this invention, the spring is discarded as a means of primary support along the line of movement of the mass. Springs are used only for centering the mass in the magnetic field and restricting or preventing lateral and undesirable rotational movement of the mass. They are used to restrict the mass to a single degree of freedom, leaving only a single line along which the mass may move in either direction. Limited rotational motion around the line of free movement as an axis, is not inherently undesirable, however, and a limited amount of such rotation is permitted in the embodiment of the invention described herein.

As regards support along the line of free movement, the mass is supported by a magnetic field and appurtenant circuits, so that it has a period of vibration approaching infinity. If the mass is set in motion, within the limits of the physical size of the apparatus, the mass will continue that motion at the speed which was imparted to it. If the mass is subjected to a force, it will accelerate at a constant rate. The mass will not return to the position from which it started, upon removal of the moving force. These are some of the incidents of an infinite period, which is approached by this invention.

The first element of the magnetic support of the mass is a linear magnetic field or its equivalent, in which an energized coil is situated. In accordance with this invention, a novel means of obtaining the linear magnetic field is used.

Figure 1:
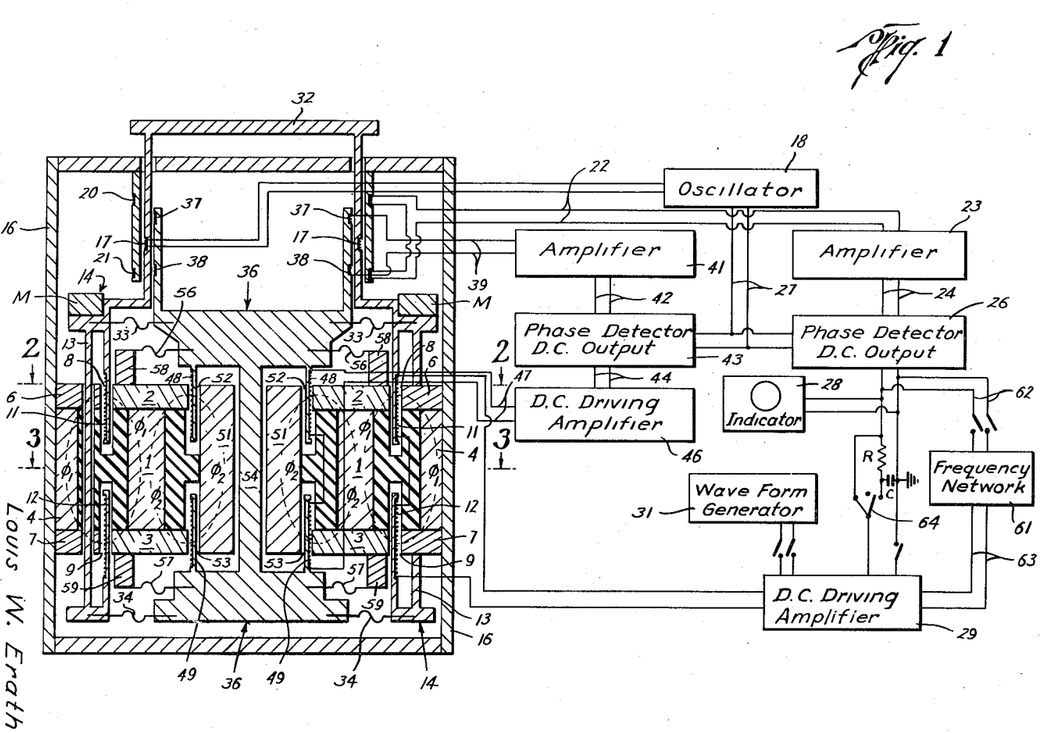
Figure 1 is a diagrammatic sectional view of the physical and mechanical parts of the invention, together with a simplified schematic circuit diagram illustrating the basic electrical circuit of the invention.
Figures 2, 3, 4:
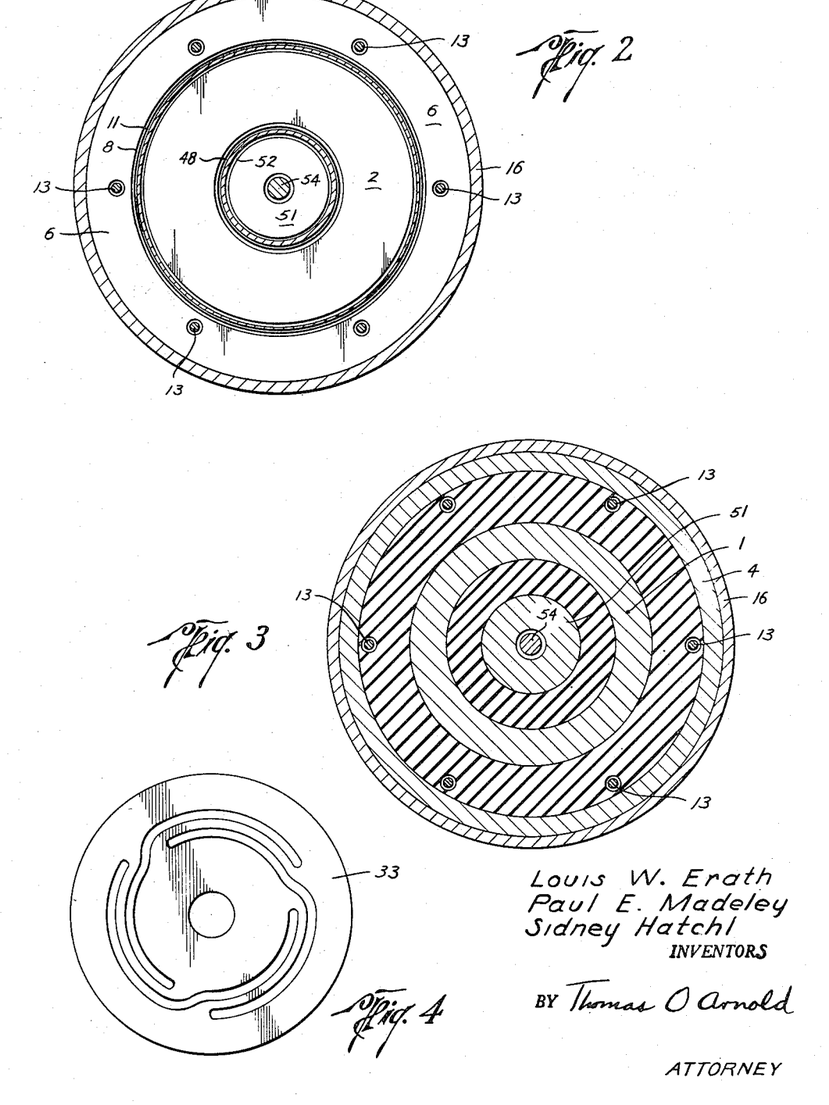
Figure 2 is a sectional view taken along line 2—2 of Figure 1, but showing only the mechanical parts.
Figure 3 is a sectional view taken along line 3—3 of Figure 1, showing only the mechanical parts.
Figure 4 is a plan view of a typical circular leaf spring used in the preferred embodiment of the invention.

Consider Figures 1 and 2. A cylindrical permanent magnet 1, as for example Alnico, is employed. On the top of said permanent magnet 1, there is placed an annular plate 2 of magnetically permeable material which extends both inward and outward from the cylinder which is the magnet 1. On the bottom of said magnet 1 there is positioned a like annular plate 3 of magnetically permeable material. A plan view of the plate 2 is shown in Figure 2.

External of and concentric with the cylindrical magnet 1, there is an external cylinder 4 of magnetically permeable material. On the top thereof there is an outside annular plate 6, and on the bottom thereof there is another outside annular plate 7, both of magnetically permeable material.

A first magnetic circuit is thereby formed, following the path indicated by the dotted line $\phi_1$ in Figure 1, from the magnet 1, through the annular plate 2, across a first air gap 8 between the plates 2 and 6, through the outside annular plate 6, down through the external cylinder 4, through the outside annular plate 7, across a second air gap 9 between the two plates 7 and 3, through the plate 3 back to the lower end of the magnet 1.

The magnetic field across either air gap 8 or 9 is nearly linear, but there is slightly more leakage flux below the first air gap 8 than above it, and slightly more leakage flux above the second air gap 9 than below it, so that neither field, taken alone is entirely linear. The non-linearity of the two air gaps is the same, however, and in the opposite direction, so the effect of a single coil operating in both air gaps 8 and 9 will be the effect of a coil in a linear field. Likewise two identical coils, one in each air gap, connected so that forces thereon are cumulative, will respond as though a single coil were placed in a completely linear air gap.

Accordingly, an upper mass support coil (or mass driving coil) 11 and a lower mass support coil (or mass driving coil) 12, connected so that forces thereon are additive, are placed in the first air gap 8 and the second air gap 9, respectively. In the embodiment illustrated, the upper coil 11 is wound in the reverse direction from the lower coil 12 and the two coils are connected in series. When energized with a D. C. current, the force on such mass driving coils 11 and 12 is uniform no matter what the position of the mass may be, and no matter what the velocity of the mass may be with respect to the housing.

When the magnetic field across the first air gap 8 and the magnetic field across the second air gap 9 are considered together as a single field, it is seen that a perfectly linear magnetic field has been obtained, and when the two driving coils 11 and 12 are considered as a single coil, then there is a single coil operating in said perfectly linear magnetic field.

It is important to note that the structure above described for obtaining a coil in a completely linear magnetic field may be constructed in an extremely compact and sturdy manner, whereas other means previously known for this purpose are either imperfect or bulky, and therefore are impractical for many uses. The structure just described, therefore, is inventive in and of itself, even though it is also an integral part of the larger invention covered by this application. The magnetic circuit is, of course, roughly of the form of a toroid of rectangular cross section, with an air gap at the top and bottom.

In alternative embodiments of the broad invention covered hereby, conventional linear magnetic field structures may be used, although these structures are not preferred. For example, a coil that is very long with respect to the width of the air gap may perform as though in a linear magnetic field, but the extreme length of the coil makes this structure undesirable. Similarly, a coil that is very short with respect to the width of a wide magnetic field in which it operates may perform in a linear magnetic field, but a bulky magnetic circuit with large magnetomotive force is required, making this structure undesirable in the preferred instrument. Other equivalents, for purposes of the broad invention herein covered, will be apparent to those skilled in the art.

In the embodiment of the invention illustrated, the two coils 11 and 12 are structurally integrated by means of rods 13 which pass through appropriate holes in the outside annular plates. As previously indicated the two coils 11 and 12 are mass support and mass driving coils, and in Figure 1, the mass has been indicated as a ring M of dense material carried by the same structure that integrates the two mass support coils into one structural unit. The mass of the two coils 11 and 12, the rods 13 and other integrated structural parts, all of which make up the mass unit 14, are also parts of the total seismic mass. In some embodiments no special mass M is required, since the mass of the structural parts which make up the mass unit is sufficiently large for the purposes of the instrument.

Means are also provided for determining and controlling the amount of D. C. current in the mass driving or mass support coils 11 and 12. In simple form, such means may comprise a sensing element adapted to sense the position of the mass unit 14 with respect to ground, and further adapted to energize the mass driving and mass support coils 11 and 12. For purposes of this description, "ground" is considered as the instrument housing 16. Inasmuch as other body support members other than a complete housing may, on occasion be used, the term "chassis" may also be used herein to define any body members which constitute ground for purposes of this description.

Sensing elements of a variety of types, either mechanical or electrical are well known to the arts. By way of example, variable resistors, capacitors, inductances or impedances of any sort, or electric eye circuits may be used.

In the embodiment illustrated, however, a linear differential transformer is used. Secured to the mass unit 14, there is a primary coil 17 of such a differential transformer. The primary coil 17 is energized with a 200 kc. signal from an oscillator 18. A pair of secondary coils 20 and 21 are secured to the chassis or housing 16 and are positioned in proximity with, but on opposite sides of said primary coil 17. When the mass unit 14 is at its center position, the two secondary coils 20 and 21 are equidistant from the primary coil 17, and the potentials induced therein are equal in magnitude and opposite in phase. The two secondary coils 20 and 21 are connected in series, so that there is no output from them under these circumstances.

When the mass unit 14 is lower than center, however, the voltage induced in the lower secondary coil 21 is larger than that induced in the upper secondary coil 20, with the result that a signal may be derived from the series combination of the two coils that is proportional in magnitude to the amount of the displacement. Further, the phase of the output will be that of the lower coil 21, which we shall term a first phase.

Conversely, when the mass unit 14 is above the normal center, the voltage induced in the upper secondary coil 20 is the larger, and the output from the series connection of the two secondary coils 20 and 21 is of the same phase as the upper coil 20, which we shall term the opposite phase. The magnitude, however, is still proportional to the amount of the displacement from normal center.

The signal derived from the two secondary or output coils 20 and 21 is conducted through lines 22 to an amplifier 23, thence through lines 24 to a phase detector 26 with D. C. output. The phase detector 26 also receives a signal, for comparison purposes, from the oscillator 18 via two lines 27. The output voltage from the phase detector may vary on either side of zero, or entirely on one side, but in either event, a given value of the output is indicative of the mass unit 14 being centered, and a lower value or a higher value, speaking algebraically, is indicative of the mass unit 14 being lower than or higher than normal center.

The terms "lower" or "higher" have been used to correspond with Figure 1, but this invention is adapted for use in any plane whatsoever.

Conveniently, the output of the phase detector 26 may be applied to some form of indicator 28, such as an oscilloscope, which indicates the position of the mass. Recording indicators, such as oscillographs, or audio indicators may also be used in particular adaptations of the invention.

The output of the phase detector 26 is also conducted through a long time constant R-C combination to a D. C. driving amplifier 29. The output of the D. C. driving amplifier 29 is connected to the driving coils 11 and 12 with such polarity as to cause a force thereon which tends to center the mass unit.

Consider the operation of the system in a vertical position. In such a position it is sometimes convenient to have the output of the phase detector 26, and therefore of the driving amplifier 29, vary only on one side of zero, the current being always in such a direction as to effect an upward force on the mass support coils 11 and 12. The weight of the mass unit 14 can be used as the downward urging force. If the mass unit 14 drops slightly below center, a current commences to flow creating a force tending to move the mass unit 14 upward. As the unit drops further the current increases until the weight of the mass unit 14 is exactly counter-balanced by the force on the mass support coils 11 and 12.

The secondary coils 20 and 21 of sensing element respond immediately to every movement of the mass unit 14, and the indicator 28 therefore gives an accurate indication of the relative movements between the mass and the housing. Since the signal derived from the sensing element must pass through a long time constant R-C combination, the force on the support coil does not vary with transient movements of the mass unit. The natural period of movements of the mass with respect to the housing may be made to approach infinity just as closely as the time constant of the R-C combination may be made to approach infinity.

The voltage derived from the sensing element is indicative of displacement of the mass unit. If desired, the indicator 28 may include a circuit for the electrical differentiation of the sensing element signal, thereby deriving an indication of velocity of movement of the mass. A second differentiation produces an indication of the acceleration of the mass.

The structure described above is useful in any seismometer and is a highly superior structure for low frequency instruments.

It is apparent that the system as above described is a gravity meter as well as a seismometer. Whatever the weight of the mass unit 14, a sufficient current flows in the mass support system to support the mass unit 14. If gravity is great at a particular place, the weight of the mass unit 14 is great, and the current required to support it is likewise great. This current is indicated on the indicator 28. Conversely, in areas of low gravity, less current is required for support purposes, and that lesser amount of current is indicative of the lower gravity.

This gravity meter has tremendous advantages over the various spring forms of gravity meters, in that springs which support masses tend to take on a permanent set, thereby causing erroneous readings. In accordance with this invention, springs do not support the weight of the mass, and this troublesome problem is thereby avoided.

In many adaptations of the invention, either when used as a seismometer or otherwise as hereinafter described, it may be preferable to cause the output of the phase detector 26 to vary on either side of zero rather than on only one side of zero as above discussed. This may be true, for example, when the instrument is used as a seismometer with the line of free movement of the mass unit 14 in a horizontal plane, or when it is desired to support the mass unit 14 against forces resulting from acceleration along lines at various angles and in various directions. Such an arrangement may also be preferred when the instrument is used as a shaking table as hereinafter described, when a force in excess of one G is desired in the downward direction. A similar preference may prevail when the invention is used in other adaptations, such as, for example, when it is desired to make the instrument, when used as a seismometer, unresponsive to certain vibrations of great amplitude.

Alternatively to use for the purpose of supporting the mass unit by a system of infinite period, as in the seismometer and gravity meter, the same system, with the addition of a wave form generator 31, may be used to drive the mass unit 14 in any particular motion pattern. The signal from the sensing element may still be used to support the mass unit when the instrument is operated in planes other than the horizontal.

A signal from the wave form generator 31 is conducted, along with the signal from the sensing element, to the driving amplifier 29, and the mass unit 14 may thereby be driven in response to any wave form which may be generated, even though such wave form includes low frequency components, high frequency components, or even step functions.

It follows that by the addition of a table 32 to the structure of the mass unit 14, a shaking table is effected. This shaking table has more flexibility and is less expensive and more compact than previously known shaking tables. The indicator provides an accurate record of the motions of a table, which can be used to compare with the records of seismometers which may be placed upon the table for testing.

Those skilled in the art will note that the table's absolute conformity to a step form is limited by the time of the R-C time constant. If a D. C. voltage moves the table up a given distance, the sensing element puts out a signal which eventually passes through the R-C combination and effects movement of the table back toward center.

When it is desired to shake the table in sinusoidal wave forms of varying frequency but with certain characteristics constant, the output of the wave form generator is varied in certain manners. For example, acceleration remains constant with varying frequency if the voltage output of the wave form generator remains constant for the reason that the accelerating force remains constant. If 6 db is added per octave of frequency increase, the velocity of the table remains constant with the increasing frequency. If 12 db is added per octave of frequency increase, the displacement of the table remains constant.

Thus far, measurements of weight and of motion and generation of motion along a single line, the one line along which the mass unit is free to move, have been discussed. No mention has been made of the means employed for restricting the freedom of motion of the mass unit 14 to the one degree.

It is possible to use a variety of means for holding the mass unit 14 rigidly in position, i. e., for preventing lateral movement of any part of the mass unit 14. Magnetic means might be used. Or the rods 13 might be of such size as to fit snugly in their respective holes through the magnetic circuit, thereby positioning the mass unit 14. Circular leaf springs of the general form illustrated in Figure 4, are highly satisfactory excepting for their high restoring force. This high restoring force results in a high natural frequency of such a spring in combination with a mass.

Therefore, in accordance with one embodiment of this invention, these circular leaf springs are used, but they are made to behave as though they have a restoring force approaching zero, or any desired restoring force above that near zero value. This incident of zero restoring force is, of course, an incident of the spring of infinite length, and the performance above indicated is also the performance of a spring of infinite length.

Conveniently the mass unit 14 is positioned by an upper spring 33 secured at the top of the rods 13 and a lower spring 34 secured at the bottom of the rods 13. Each of said springs 33 and 34 are also secured to a follow-up unit 36, which, as hereinafter described, constitutes a movable support for the mass unit 14. This is by way of contrast to structures previously known, wherein mass support springs were connected between the mass and housing or other ground.

Consider, for purposes of explanation of theory, a coil spring 10 feet long, rigidly secured at one end and supporting a lead weight on the other. If the weight is lifted 2 inches and released, it vibrates up and down through a distance of four inches—two inches above center and two inches below. The lower end of the spring vibrates through this same four inch distance. The upper end of the spring remains stationary. The center of the spring, however, vibrates through a two inch distance—one inch upward and one inch downward. If the center of the spring can be made to vibrate through this two inch distance in synchronism with the vibration of the lower end of the spring, then the top five feet of the spring can be thrown away and the lead weight will continue to vibrate exactly as before.

Or, consider a point nine feet from the top of the ten foot spring. This point vibrates through a distance of $9/10$ of the four inches. If this point can be made to vibrate in this manner by mechanical means, then nine feet of the spring can be thrown away and the lead weight will vibrate as before. A short spring is thereby made to perform like a very long one. I. e., a mass-spring system of high natural frequency is thereby made to perform like a mass-spring system of very low natural frequency.

If the upper end of the spring is made to follow the lower end exactly, then the mass-spring system is made to perform as though its natural frequency was absolutely zero. The spring is made to perform as though it had infinite length and a zero restoring force. This principle is, of course, applicable to any type of spring. Leaf springs have been chosen in the preferred embodiment illustrated because of their greater stiffness against lateral and rotational movements.

The effect just discussed is accomplished in accordance with this invention by the use of a feedback circuit, similar in many respects to the circuit previously described as a part of the mass support means.

A second sensing element is adapted to sense motion of the mass unit 14 relative to the follower unit 36. This sensing element puts out a signal which is used to drive the follower unit 36 in the same direction that the mass unit 14 is moving. By adjusting the gain in the follower driving circuit, the "top" of the spring, i. e., that end of the leaf springs 33 and 34 which are attached to the follower unit 36, can be made to follow the mass almost exactly, or to follow it only partially, as desired.

If the "top" of the spring is made to follow the mass exactly, the system is then equivalent to a system with a natural frequency of zero, i. e., a natural period of infinity. It is seen that any natural frequency desired can be obtained with any spring.

The follower system is quite similar to the mass support system. A second differential transformer, adapted to sense relative motion between the mass unit 14 and the follower unit 36, is used as the follower sensing element. Conveniently, the same primary coil 17, as was used for the mass support system sensing element can be used. A second pair of secondary coils 37 and 38 are positioned on opposite sides of the primary coil 17, and are secured to the follower unit 36.

The second pair of secondary coils 37 and 38 are connected in series, and their output is conducted by lines 39 to an amplifier 41, thence by lines 42 to a phase detector 43 with D. C. output proportional to the magnitude of the sensing element output. The phase detector 43 also receives a comparison signal from the oscillator 18 through lines 27.

The output of the phase detector 43 is conducted by lines 44 to a D. C. driving amplifier 46, thence by lines 47 to two follower driving coils 48 and 49 which are positioned in linear magnetic field in the same manner as the mass driving coils.

Conveniently, the same source of magnetomotive force previously described, namely the magnet 1, may be used for the follower magnetic circuit. A magnetically permeable cylinder 51 is positioned concentric with and inside the upper annular plate 2 and lower annular plate 3. The follower magnetic circuit, indicated in Figure 1 by the dotted line $\phi_2$ is formed from the magnet 1, through the upper plate 2, across an upper air gap 52 between the upper plate 2 and the inside cylinder 51, down through the inside cylinder 51, across a lower air gap 53, and through the lower plate 3 back to the magnet 1.

The two follower driving coils 48 and 49 are connected in series, and are structurally integrated by a spindle 54 passing through the middle of the inside cylinder 51.

The follower unit 36 must be positioned laterally with respect to the second magnetic field and in line with the line of free movement of the mass unit; its lateral and rotational motion must be restricted. Accordingly an upper follower spring 56 of circular leaf form, and a lower follower spring 57 also of circular leaf form, are connected to the upper and lower ends respectively of the spindle 54 and to an upper annulus 58 and a lower annulus 59, respectively.

The two annuli 58 and 59 are preferably of nonpermeable material and are secured to the upper and lower annular plate 2 and 3. As indicated in Figure 1, all parts of both magnetic circuits, including the upper and lower annular plates 2 and 3, are rigidly mounted in the housing 16, the supports for the magnetic circuits parts being of nonpermeable material. It is apparent, therefore, that the follower unit 36 is laterally positioned by springs 56 and 57 connecting the follower unit 36 to ground, and the mass unit 14 is positioned laterally by springs 33 and 34 connecting the mass unit 14 to the follower unit 36.

In the operation of the invention as a seismometer, the action of the follower springs 56 and 57 are controlled by the follower coils 48 and 49, and so these springs do not substantially influence the natural frequence of the mass system. The follower unit 36 is made to follow the movement of the mass unit 14, so that the effective natural frequency of the mass unit springs 33 and 34 is controllable, by adjusting the gain in the follower circuit. The effective length of these springs may be adjusted so as to approach infinity and the natural frequency of the system thereby approaches zero. Hence the undesirable effects of spring suspension are avoided, even though the most rigid springs may be used.

When the instrument is used as a seismometer, and it is desired to restrict or eliminate response to a particular large amplitude vibration, means are employed whereby the mass unit is driven in synchronism with the objectionable vibration, so that little or no movement of the mass unit 14 with respect to the housing 16 occurs at the objectionable frequency.

Conveniently, such means may take the form of a frequency network 61 adapted to receive the signal from the first phase detector 26 by lines 62. The output of the frequency network 61 is conducted by lines 63 to the D. C. driving amplifier 29, or in the alternative to another driving amplifier (not shown) which in turn is adapted to supplement the current in the mass driving coils 11 and 12 which is supplied by the driving amplifier 29.

The frequency network 61 may be adapted to pass all frequencies from zero to a predetermined value, or all frequencies from a predetermined value upward, or to pass a band of frequencies, or to pass all but a band of frequencies. Whatever frequencies are passed by the frequency network 61, they are amplified by the driving amplifier 29 to an amplitude substantially equivalent to the amplitude of the undesired vibration and are applied to the driving coils 11 and 12 in such direction as to cause the mass unit 14 to follow the movements of the housing 16 at the undesired frequencies. The relative movement between mass unit 14 and housing 16 at the frequencies at which measurement is desired need not be affected.

The system is thereby made unresponsive to the undesired vibration before it is even picked up. The mass unit is prevented from being through against stops which limit its motion, and the hitting of stops by the mass unit, which would preclude measurement of the lower amplitude frequencies, is thereby avoided. This invention is the first seismometer of any kind which does not pick up an undesired frequency, or which measures a low amplitude vibration in the presence of a very high amplitude vibration. Note that in this invention the frequency which is discriminated against may be close to the measured frequency and may be either higher or lower than the measured frequency.

As previously described, the primary support of the mass unit, insofar as its movement along the line in which it is free to move is concerned, is by means of a magnetic field. The support is massless, as contrasted to previously known suspensions wherein the support itself has at least some mass which produces spurious responses in the instrument.

Conveniently, a switch 64 may be provided whereby the resistor R can be shorted and the long time constant done away with for zero positioning of the mass unit and for certain low frequency uses of the invention for shaking table purposes.

The invention can be used for its various purposes in any plane, by adjusting the output of the phase detectors to change from one direction to the other as the mass unit passes through center. This flexibility as to plane of operation permits its use for a variety of purposes. For example it may be used as an accelerometer in a rocket missile under test.

Although the theory discussed herein may seem to indicate that a suspension is obtainable with a natural period of absolute infinity, there are practical limitations which prevent that degree of perfection. For example there is mass and a certain imperfect resiliency in the wires connected to the moving parts. Though this invention does permit a natural period longer than that of previously known systems, and in a structure more compact and more sturdy than previously known systems, the natural period of this invention is finite. Those skilled in the art will appreciate that conventional damping and compensating means may, if the need should arise, be used on this invention to permit measurements and generation of motion at and below the natural frequency of the system herein described.

It is sometimes found convenient to introduce additional D. C. voltages into the mass circuit in conventional manners to assist in the rapid centering of the mass unit and calibration of particular indicators.

Figure 5:
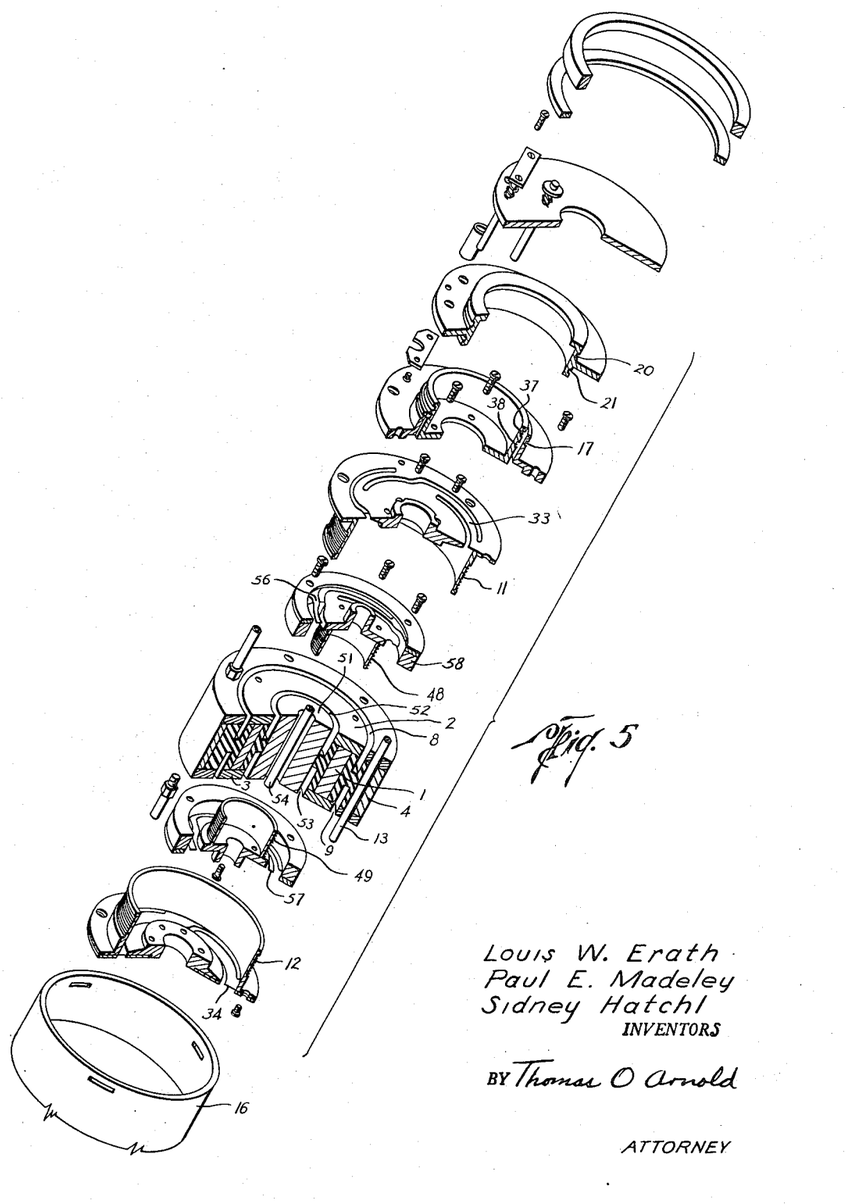
Figure 5 is an exploded view of the mechanical parts of the invention, illustrating generally how they may be constructed and assembled.

A pictorial exploded view of a preferred assembly of the mechanical parts without table attachment, is shown in Figure 5. It will be seen that some of the parts described above as separate are unified in Figure 5, and that many incidentals of the bolt, nut and screw class which were omitted from Figures 1, 2 and 3 and the description relative thereto, are included in Figure 5.

It is apparent that modifications can be made in the apparatus as above described without departure from the scope of the invention, and the description is not to be construed as any limitation upon the invention as defined in the following claims.

We claim:

1. In apparatus of the type described, the combination of a chassis; a follower; resilient means for mounting said follower on said chassis in such manner as to permit movement of said follower in one line; a mass mounted in such manner as to permit movement of said mass in line with the movement of said follower; resilient means connecting said mass to said follower; a sensing element adapted to generate a signal which is responsive to relative movement between said mass and said follower; and means for driving said follower in response to said signal whereby said follower follows the motion of said mass.

2. Apparatus of the type described in claim 1 characterized by the addition of indicator means responsive to the relative position of said mass and said follower.

3. A shaking table comprising a table suspended by resilient means; means for generating a linear magnetic field; a coil secured to said table and adapted for movement in said linear magnetic field; means for sensing the position of said coil in said linear magnetic field; a circuit responsive to said sensing means for energizing said coil in such manner as to cause said coil to support said table; and a wave form generator adapted to supply predetermined wave forms to said coil, whereby said table is driven in response to said predetermined wave form.

4. The combination of a chassis; a follower including a first and a second follower coil; means for suspending said follower with respect to said chassis whereby said follower may have reciprocal movement with respect to said chassis along a single line; a first closed circuit of magnetically permeable material secured to said chassis, said magnetically permeable material being generally of hollow toroidal form with first and second gaps therein and including a source of magnetic flux, said first and second gaps having magnetic fields there-across of substantially identical form, said first follower coil being adapted to move within said first gap and said second follower coil being adapted to move within said second gap; a mass including a first mass coil and a second mass coil; means for suspending said mass with respect to both said chassis and said follower, whereby said mass may have reciprocal movement with respect thereto along a single line; a second closed circuit of magnetically permeable material secured to said chassis, said magnetically permeable material being generally of hollow toroidal form with first and second gaps therein and including a source of magnetic flux, said first and second gaps having magnetic fiields there-across of substantially identical form, said first follower coil being adapted to move within said first gap and said second follower coil being adapted to move within said second gap; means for generating a first direct current signal responsive to relative movement between said mass and said follower; means for impressing said first direct current signal upon said first and second follower coils in such manner as to cause said follower to follow the motion of said mass; means for generating a second direct current signal responsive to relative movement between said mass and said chassis; and means for eliminating substantially all transients from said second signal and impressing the resultant on said first and second mass coils whereby said resultant tends to generally position said mass with respect to said chassis while not affecting relative movement of a transient character between said mass and said chassis.

5. The combination of a chassis; a follower including a first and a second follower coil; means for suspending said follower with respect to said chassis whereby said follower may have reciprocal movement with respect to said chassis along a single line; a first closed circuit of magnetically permeable material secured to said chassis, said magnetically permeable material being generally of hollow toroidal form with first and second gaps therein and including a source of magnetic flux, said first and second gaps having magnetic fields there-across of substantially identical form, said first follower coil being adapted to move within said first gap and said second follower coil being adapted to move within said second gap; a mass including a first mass coil and a second mass coil; means for suspending said mass with respect to both said chassis and said follower, whereby said mass may have reciprocal movement with respect thereto along a single line; a second closed circuit of magnetically permeable material secured to said chassis, said magnetically permeable material being generally of hollow toroidal form with first and second gaps therein and including a source of magnetic flux, said first and second gaps having magnetic fields there-across of substantially identical form, said first follower coil being adapted to move within said first gap and said second follower coil being adapted to move within said second gap; means for generating a first direct current signal responsive to relative movement between said mass and said follower; means for impressing said first direct current signal upon said first and second follower coils in such manner as to cause said follower to follow the motion of said mass; means for generating a second direct current signal responsive to relative movement between said mass and said chassis; and means for eliminating selected transients from said second signal while passing other selected transients and for impressing the resultant on said mass coil whereby the resultant tends to eliminate relative motion of a selected frequency between said mass and said chassis.

6. The combination of a chassis; a follower including a follower coil adapted to be positioned in a magnetic field; means for positioning said follower with respect to said chassis, said means permitting vibratory movement of said follower with respect to said chassis along a single line while restricting all other movement of said follower with respect to said chassis; a mass including a mass coil adapted to be positioned in a magnetic field; means for positioning said mass with respect to said follower and said chassis, said means permitting vibratory movement of said mass with respect to said follower and said chassis along a single line while restricting all other movement of said mass with respect to said follower and said chassis; magnetic flux generating means secured to said chassis and adapted to envelop at least a portion of said follower coil and said mass coil in magnetic flux; means for generating a first direct current signal responsive to relative movement between said mass and said follower; electric circuit means for impressing said first direct current signal upon said follower coil in such manner as to cause said follower to follow the motion of said mass; means for generating a second direct current signal responsive to relative movement between said mass and said chassis; means for eliminating substantially all transients from said second signal; electric circuit means for impressing said second signal upon said mass coil in such manner as to cause said mass to be positioned with respect to said chassis, by the force resulting from the passage of said second signal through said mass coil.

7. The combination of a chassis; a follower including a follower coil adapted to be positioned in a magnetic field; means for positioning said follower with respect to said chassis, said means permitting vibratory movement of said follower with respect to said chassis along a single line while restricting all other movement of said follower with respect to said chassis; a mass including a mass coil adapted to be positioned in a magnetic field; means for positioning said mass with respect to said follower and said chassis, said means permitting vibratory movement of said mass with respect to said follower and said chassis along a single line while restricting all other movement of said mass with respect to said follower and said chassis; magnetic flux generating means secured to said chassis and adapted to envelop at least a portion of said follower coil and said mass coil in magnetic flux; means for generating a first direct current signal responsive to relative movement between said mass and said follower; electric circuit means for impressing said first direct current signal upon said follower coil in such manner as to cause said follower to follow the motion of said mass; means for generating a second direct current signal responsive to relative movement between said mass and said chassis; means for eliminating selected transients from said second signal while passing other selected transients; electric circuit means for impressing said second signal with only selected transients included therein upon said mass coil whereby the last mentioned second signal tends to eliminate relative motion between said mass and said chassis of a selected frequency.

8. A mass suspension system comprising a chassis; a follower; resilient support means with alternate ends secured to said chassis and to said follower whereby said follower is permitted to move with respect to said chassis within predetermined limits; a spring with the first end thereof secured to said follower; a mass suspended from the second end of said spring; means for producing two magnetic fields, each such field having a first side and a second side, the variations in flux density from the first side to the second side of both fields being substantially identical; a first follower coil and a second follower coil both secured to said follower; said first and second follower coils being adapted for reciprocal movement in said first and said second magnetic fields, respectively, each coil moving with respect to the first and second sides of its respective field, substantially identically with the movement of the other coil with respect to the first and second sides of its respective field; means for generating a signal responsive to the movements of said mass with respect to said follower; and means for converting said signal to a D. C. voltage and impressing it upon said coils; whereby the first end of said spring is caused to follow the movements of said mass.

9. Electrical apparatus comprising a first magnetic circuit element, being a length of magnetically permeable material of hollow cylindrical form; a second magnetic circuit element, being a length of permanent magnet of hollow cylindrical form positioned concentrically within said first element; a third magnetic circuit element, being a length of magnetically permeable material of hollow cylindrical form positioned concentrically within said permanent magnet; said magnetic circuit elements being rigidly secured in spaced apart relationship with each other so that two magnetic circuits of generally toroid form are created, the first circuit being from the magnet, across a first gap adjacent one end thereof to said first element, through said first element to the other end thereof, across a second gap, adjacent the other end of said first element, back to the magnet, and the second circuit being from the magnet, across a third gap adjacent one end thereof to said third element, through said third element to the other end thereof, and across a fourth gap, adjacent the other end of said third element, back to the magnet; the magnetic field across said first gap being identical in form to the magnetic field across said second gap, and the magnetic field across said third gap being identical in form to the magnetic field across said third gap, the form of the fields across said first and third gaps being inverted with respect to the form of the fields across said second and fourth gaps; a follower resiliently suspended from said magnetic circuit elements and adapted for reciprocating movement within limits axially of said cylindrical magnetic circuit elements; a follower coil having first and second elements, said first element extending through said third gap and said second element extending through said fourth gap; a mass resiliently suspended from said follower; a mass coil having first and second elements, said first element extending through said first gap and said second element extending through said second gap; an oscillator adapted to generate an alternating sensing signal; a primary sensing coil secured to said mass and adapted to receive said sensing signal; two follower sensing coils mounted on said follower on opposite sides of said primary sensing coil and adapted for inductive coupling with said primary sensing coil whereby an electric current is induced in said follower sensing coils which current is responsive to the position of said follower with respect to said mass; electric circuitry for converting said current into direct current and for impressing said direct current on said follower coil in such direction as to effect a force on said follower coil in a direction tending to bring said follower into a predetermined alignment with said mass; two mass sensing coils secured to said magnetic circuit elements, positioned on opposite sides of said primary sensing coil and adapted for inductive coupling with said primary sensing coil whereby an electric current is induced in said mass sensing coils which current is responsive to the relative position of said mass and said magnetic circuit elements; and electric circuitry including indicator means responsive to the last mentioned electric current for showing the position of said mass relative to said magnetic elements.

10. Electrical apparatus comprising a chassis; a first circuit of magnetically permeable material having two gaps therein, said circuit including a source of magnetic flux and said gaps being so formed that the pattern of flux across one of said gaps is substantially identical to the pattern of flux across the other of said gaps; a second circuit of magnetically permeable material having two gaps therein, said second circuit including a source of magnetic flux and said gaps being so formed that the pattern of flux across one of said gaps is substantially identical to the pattern of flux across the other of said gaps; said circuits being integrated into one rigid structure with said chassis and constituting a part of the chassis of the apparatus; a follower resiliently suspended from said chassis and adapted for reciprocating movement relative to said chassis within predetermined limits; a follower coil secured to said follower and having two segments, the first segment being positioned to be cut by flux occupying the first gap in said first circuit, and the second segment being positioned to be cut by flux occupying the second gap in said first circuit; a mass resiliently suspended from said follower; a mass coil secured to said mass and having first and second segments, said first segment being positioned to be cut by flux occupying the first gap in said second circuit and said second segment being positioned to be cut by flux occupying the second gap in said second circuit; means for obtaining an electric current responsive to the distance said follower may be out of a predetermined alignment with said mass; means for modifying said electric current and for impressing said electric current upon said follower coil in such manner as to effect a force on said follower coil in a direction tending to bring said follower into said predetermined alignment with said mass; means for obtaining an electric current responsive to the distance said mass may be out of a predetermined alignment with said chassis; and indicator means responsive to said last mentioned current.

11. The invention defined in claim 10, wherein one source of magnetic flux is common to both circuits of magnetically permeable material.

12. The apparatus defined in claim 10, wherein the first of said means for obtaining an electric current comprises a differential transformer with first and second coils, said first coil being secured to said follower and said second coil being secured to said mass, one of said coils being adapted to receive an alternating signal from some appropriate source; and wherein the second of said means for obtaining an electric current comprises a differential transformer with first and second coils, said first coil being secured to said mass and said second coil being secured to said chassis, one of said coils being adapted to receive an alternating signal from some appropriate source.

13. Electrical apparatus comprising a chassis; a first circuit of magnetically permeable material having two gaps therein, said circuit including a source of magnetic flux; a second circuit of magnetically permeable material having two gaps therein, said second circuit including a source of magnetic flux; said circuits being integrated into one rigid structure with said chassis and constituting a part of the chassis of the apparatus; a follower resiliently suspended from said chassis and adapted for reciprocating movement relative to said chassis within predetermined limits; a follower coil secured to said follower and having two segments, the first segment being positioned to be cut by flux occupying the first gap in said first circuit, and the second segment being positioned to be cut by flux occupying the second gap in said first circuit; a mass resiliently suspended from said follower; a mass coil secured to said mass and having first and second segments, said first segment being positioned to be cut by flux occupying the first gap in said second circuit and said second segment being positioned to be cut by flux occupying the second gap in said second circuit; means for obtaining an electric current responsive to the distance said follower may be out of a predetermined alignment with said mass; means for modifying said electric current and for impressing said electric current upon said follower coil in such manner as to effect a force on said follower coil in a direction tending to bring said follower into said predetermined alignment with said mass; means for obtaining an electric current of variable direct current type that is responsive to the distance said mass may be out of a predetermined alignment with said chassis; circuitry for eliminating from the last mentioned electric current variations of predetermined frequencies; means for impressing the output from said last mentioned circuitry upon said mass coil in such manner as to effect a force on said mass coil in a direction tending to bring said mass into said predetermined alignment with said mass.

14. The apparatus defined in claim 13 characterized by the addition of indicator means responsive to the electric current that is responsive to the distance said mass may be out of a predetermined alignment with said chassis.

15. The apparatus defined in claim 13 wherein a single source of magnetic flux is common to both circuits of magnetically permeable material.

16. The apparatus defined in claim 15 characterized by the addition of indicator means responsive to the electric current that is responsive to the distance said mass may be out of a predetermined alignment with said chassis.

17. Electrical apparatus comprising a chassis; a first circuit of magnetically permeable material having two gaps therein, said circuit including a source of magnetic flux; a second circuit of magnetically permeable material having two gaps therein, said second circuit including a source of magnetic flux; said circuits being integrated into one rigid structure with said chassis and constituting a part of the chassis of the apparatus; a follower resiliently suspended from said chassis and adapted for reciprocating movement relative to said chassis within predetermined limits; a follower coil secured to said follower and having two segments, the first segment being positioned to be cut by flux occupying the first gap in said first circuit, and the second segment being positioned to be cut by flux occupying the second gap in said first circuit; a mass resiliently suspended from said follower; a mass coil secured to said mass and having first and second segments, said first segment being positioned to be cut by flux occupying the first gap in said second circuit and said second segment being positioned to be cut by flux occupying the second gap in said second circuit; means for obtaining an electric current responsive to the distance said follower may be out of a predetermined alignment with said mass; means for modifying said electric current and for impressing said electric current upon said follower coil in such manner as to effect a force on said follower coil in a direction tending to bring said follower into said predetermined alignment with said mass; means for producing a mass driving signal of predetermined wave form and for impressing such signal upon said mass coil.

18. The invention defined in claim 17 characterized by the addition of means for indicating the relative position of said mass and said chassis.

19. The apparatus defined in claim 17 wherein a single source of magnetic flux is common to both circuits of magnetically permeable material.

20. Electrical apparatus comprising a chassis; a source of magnetic flux; a circuit of magnetically permeable material having two gaps therein, said circuit including said source of magnetic flux; said circuit being integrated into one structure with said chassis and constituting a part of the chassis of the apparatus; a mass resiliently suspended from said chassis and adapted for reciprocal movement with respect thereto within predetermined limits; at least a portion of said mass being adapted to make convenient contact with some external object; a mass coil secured to said mass and having first and second segments, said first segment being positioned to interact with flux occupying the first gap in said circuit and said second segment being positioned to interact with flux occupying the second gap in said circuit; means for producing a mass driving signal of predetermined wave form and for impressing such signal upon said mass coil.

21. The combination of a chassis; a mass; means for suspending said mass with respect to said chassis whereby said mass may have reciprocal movement with respect to said chassis along a single line; a circuit of magnetically permeable material having an air gap therein and having a source of magnetic flux therein; a drive coil secured to said mass and positioned within said air gap and adapted for movement therein in a direction transverse to the lines of flux in said air gap; a pair of inductively coupled coils, one secured to said chassis and the other secured to said mass, means including a source of A.-C. voltage for driving an A.-C. current through one of said inductively coupled coils, the other coil being positioned in the path of flux generated by said current and operable to produce a voltage thereacross of magnitude indicative of the relative position of said two coils and thereby of the relative position of said mass and said chassis; means for generating a direct current voltage responsive in amplitude to said signal and for impressing said direct current voltage upon said drive coil whereby said mass is urged toward a predetermined normal position; and means for indicating the magnitude of said direct current voltage.

22. In apparatus of the character described, the combination of a chassis; a follower; means for mounting and positioning said follower with respect to said chassis so that said follower has freedom to move with respect to said chassis in either direction along a single line and has substantially no other freedom of movement; a mass; means for mounting and positioning said mass with respect to said follower and with respect to said chassis, including connection by resilient means between said mass and said follower, so that said mass has freedom to move with respect to said follower and with respect to said chassis along a single line parallel to the aforementioned line, and has substantially no other freedom of movement; sensing means for sensing the relative positions of said follower and said mass; means responsive to said sensing means for moving said follower to follow movement of said mass relative to said chassis; electromagnetic means operable between said chassis and said mass for supporting said mass against the force of gravity thereon, such means including sensing means for sensing the position of said mass with respect to said chassis, an electromagnetic force applying means adapted to apply a force on said mass in opposition to gravity, and means for varying the force of said electromagnetic force applying means in response to said sensing means.

23. Apparatus of the type described in claim 22, characterized by the addition of means for indicating relative motion between said mass and said chassis.

24. A mass suspension system comprising the combination of a mass; a chassis with respect to which said mass is to be suspended so as to move reciprocally relative to said chassis; a follower mounted on said chassis for relative reciprocal movement with respect to said chassis, the axis of reciprocal movement of the follower being parallel to the axis of reciprocal movement of the mass; a spring with first and second ends, said first end being secured to said mass and said second end being secured to said follower, said spring being operable to constrain said follower against movement with respect to said mass in directions at right angles to the direction of reciprocal movement of said mass while permitting said mass and said follower to reciprocate one with respect to the other; means for sensing the movement of the second end of said spring with respect to the first end thereof; and means responsive to said sensing means for causing the first end of said spring to follow the motion of the second end.

References Cited in the file of this patent

UNITED STATES PATENTS

| | | |
|---|---|---|
| 2,136,219 | Scherbatskoy | Nov. 8, 1938 |
| 2,289,962 | Hancock | July 14, 1942 |
| 2,533,249 | Henson | Dec. 12, 1950 |
| 2,540,796 | Stanton | Feb. 6, 1951 |
| 2,589,710 | La Coste et al. | Mar. 18, 1952 |
| 2,657,374 | Bardeen | Oct. 27, 1953 |
| 2,674,885 | Silverman | Apr. 13, 1954 |
| 2,675,222 | Clark | Apr. 13, 1954 |